United States Patent [19]

Boyesen

[11] 4,389,982
[45] Jun. 28, 1983

[54] INTERNAL COMBUSTION ENGINE FUEL SUPPLY SYSTEM

[75] Inventor: Eyvind Boyesen, Kempton, Pa.

[73] Assignee: Performance Industries, Inc., Kempton, Pa.

[21] Appl. No.: 313,212

[22] Filed: Oct. 20, 1981

[51] Int. Cl.³ .................... F02M 35/10; F02B 33/04
[52] U.S. Cl. ................. 123/73 R; 123/52 M; 123/65 E; 123/65 WV; 123/73 A; 123/433; 123/470; 123/660
[58] Field of Search ......... 123/65 WV, 65 E, 52 MB, 123/52 ML, 52 M, 73 R, 73 A, 660, 433, 470, 471

[56] References Cited

U.S. PATENT DOCUMENTS

| | | | |
|---|---|---|---|
| 2,332,916 | 10/1943 | Johnson | 123/73 V |
| 2,442,217 | 5/1948 | Smith | 123/73 V |
| 2,459,594 | 1/1949 | Smith | 123/73 V |
| 2,639,699 | 5/1953 | Kiekhaefer | 123/73 V |
| 2,752,907 | 7/1956 | Bodine, Jr. | 123/660 |
| 2,827,033 | 3/1958 | Bodine, Jr. | 123/660 |
| 3,008,459 | 11/1961 | Kaufmann | 123/73 V |
| 3,905,340 | 9/1975 | Boyesen | 123/73 V |

FOREIGN PATENT DOCUMENTS

| | | | |
|---|---|---|---|
| 55-51909 | 4/1980 | Japan | 123/52 MB |
| 379776 | 7/1973 | U.S.S.R. | 123/65 WV |

OTHER PUBLICATIONS

SAE Publication 71-0577 (published in 1971)–"How to Obtain the Desired Shape of the Fuel/Air Ratio Curve in Two-Stroke Cycle Gasoline Engines".

Primary Examiner—Wendell E. Burns
Attorney, Agent, or Firm—John T. Synnestvedt; Kenneth P. Synnestvedt

[57] ABSTRACT

A fuel supply system for an internal combustion engine having inlet porting and a fuel supply passage with valve means therein, the cross-sectional area lying within the outside passage walls being greater in the region of the valve means than in a region upstream of the valve means. An element is disposed in the passage tending to equalize the velocity of the fuel flow through the supply passage in different regions thereof, and means are also provided in connection of a fuel reservoir or vessel to the fuel supply passage or channel in the region of and through said element.

7 Claims, 4 Drawing Figures

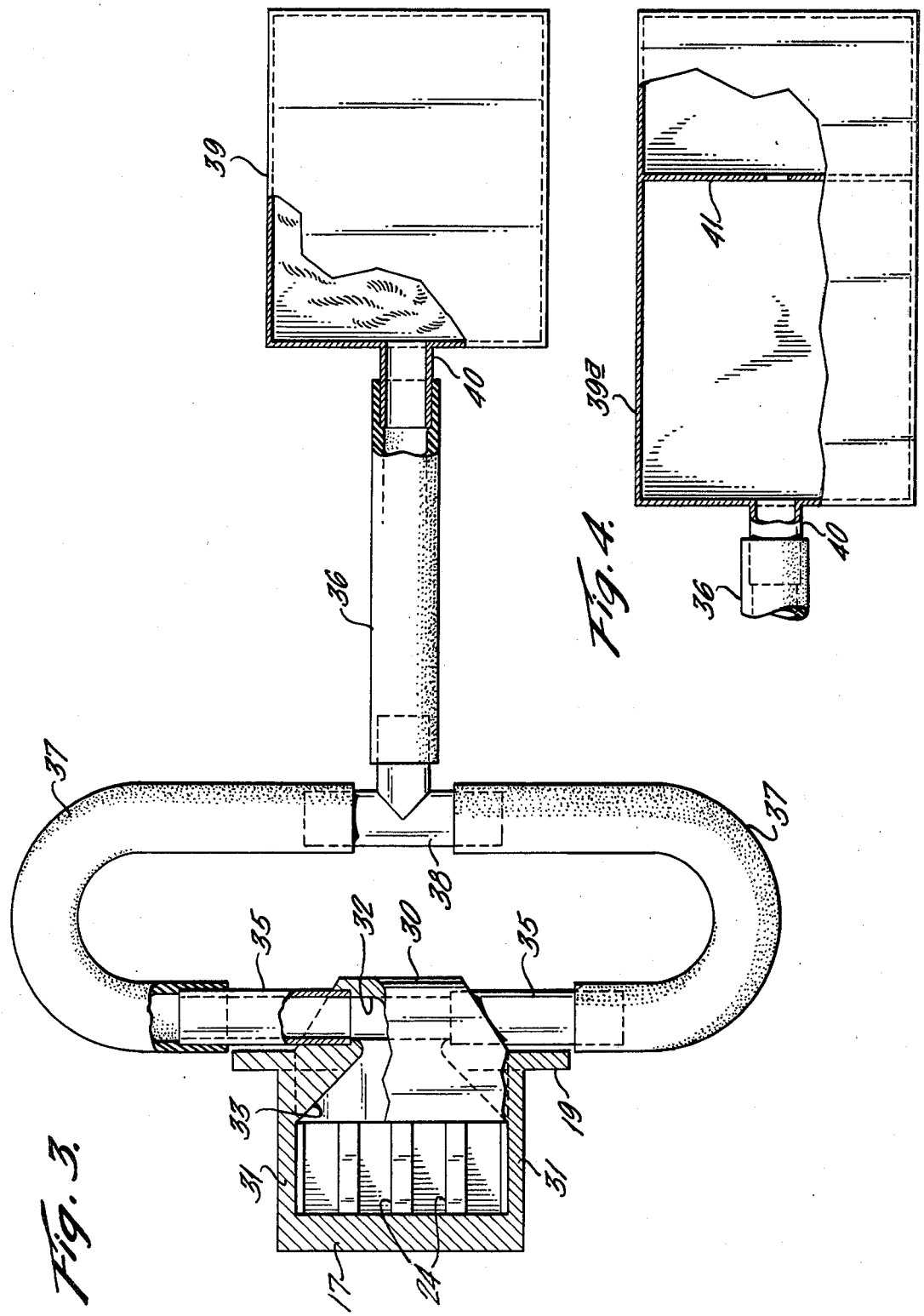

INTERNAL COMBUSTION ENGINE FUEL SUPPLY SYSTEM

INTRODUCTION AND BACKGROUND

This invention relates to internal combustion engines and is particularly concerned with a fuel supply system arranged to provide increased efficiency in the delivery of fuel to the engine.

The invention is applicable to engines of various kinds having a combustion chamber and having fuel inlet porting for delivering fuel either directly or indirectly to the combustion chamber, and certain aspects of the invention are applicable to engines of a variety of types, including engines with cylinders and reciprocating pistons therein, and engines in which the combustion chamber accommodates a rotary type of piston. Although the invention is applicable to a broad range of reciprocating piston and cylinder types of engines, the invention is herein illustrated and described as applied to a two-cycle internal combustion engine of the kind commonly employed in motorcycles, power saws, lawn mowers and other appliances and devices.

Still further, while the invention may be employed in association with fuel intake and valving systems of various kinds, the invention is particularly applicable in engines in which reed valves are employed in the fuel intake system, and the invention is, therefore, herein illustrated and described in connection with two-cycle engines employing reed valves.

In various types of engines above referred to, fuel intake porting is provided and the fuel supply means includes passage walls defining a fuel passage communicating with the inlet porting and having valve means in the passage to control the flow of fuel in the passage.

It is quite common, especially in two-cycle engines, to employ reed valves in the fuel supply passage in a region near the intake porting; and in order to accommodate the reed valve mechanism, the passage leading to the intake porting in the region of the reed valves must be of substantial cross-sectional area. This is particularly true where it is desired to employ a number of reed valves so as to maximize the fuel intake.

However, the portion of the fuel supply passage extending upstream to the carburetor or other means for introducing the fuel into the system, commonly has a cross-sectional area considerably smaller than the cross-sectional area in the region of the reed valves. It is of advantage in connection with the operation of the carburetor to avoid having a fuel delivery passage of excessive cross-sectional area, because for a given quantity of fuel and air, the rate of flow would be retarded; and in the operation of carburetors generally, the quantity of air and fuel intermixed in the carburetor is more accurately and reliably established where the velocity of delivery of the mixture is relatively high. It is, therefore, of significance in the operation of the carburetor to employ a delivery passage of relatively small cross-sectional area.

Since it is of importance to provide a space having a relatively large cross-sectional area in order to accommodate the desired reed valves and since it is desired to provide a carburetor delivery passage which is of relatively small cross-sectional area, the flow of the fuel from the passage of relatively small cross-sectional area into the space of relatively large cross-sectional area has heretofore resulted in substantial reduction in the velocity of fuel fed in the region of the reed valves. This is undesirable for several reasons, including the fact that a higher velocity in the region of the reed valves more effectively operates the reed valves; and in addition, the fluctuation in velocity of the incoming fuel mixture represents a waste of kinetic energy because of the deceleration of the fuel flowing to the cylinder.

In my prior U.S. Pat. No. 4,228,770 issued Oct. 21, 1980, a means tending to equalize the fuel flow velocity in the supply passage, is provided especially in the region of the valves where the passage walls ordinarily define a relatively large cross-sectional area.

In my patent above identified, the foregoing objective is achieved by the positioning of a bar-shaped element within the supply passage just upstream of the valves, the bar-shaped element preferably being of airfoil or aerodynamic shape having a rounded leading edge presented upstream in the flow passage and having an angular trailing edge portion presented downstream.

It is desirable that the cross-sectional area of said element in a plane transverse to the fuel supply passage be sufficient to substantially reduce the effective cross-sectional flow area in the region in which the passage walls would otherwise provide a relatively large cross-sectional flow area. In this way, the velocity of the fuel flow may be substantially maintained, with resultant improvement in efficiency and operating characteristics of the engine.

STATEMENTS OF OBJECTS AND ADVANTAGES

The arrangement of the present invention also utilizes the arrangement of my prior patent above referred to and in combination therewith the present invention contemplates use of a closed fuel receiving vessel serving as a temporary reservoir and having communication with the fuel supply channel upstream of the valves.

Moreover, according to preferred embodiments of the present invention the fuel receiving vessel is arranged to receive the gaseous fuel from the intake channel at times when the valves are closed and to return fuel to the intake channel when the valves are open.

Still further the present invention provides a connection extending from the fuel vessel to the intake channel, which connection extends through the streamlined element of my prior patent, with the delivery orifice presented downstream adjacent the trailing edge of said element. This enhances the fuel release from the vessel when the valves are open and the fuel is flowing through the intake channel, through the valves and into the cylinder.

BRIEF DESCRIPTION OF DRAWINGS

How the foregoing objects and advantages are obtained will appear more fully from the following description referring to the accompanying drawings, in which

FIG. 3 is a somewhat diagrammatic view of the fuel reservoir and its connection with the intake channel through the streamlined element positioned in that channel; and FIG. 4 is a somewhat diagrammatic view of an alternative form of fuel reservoir contemplated for use in accordance with the present invention.

Figure 1:
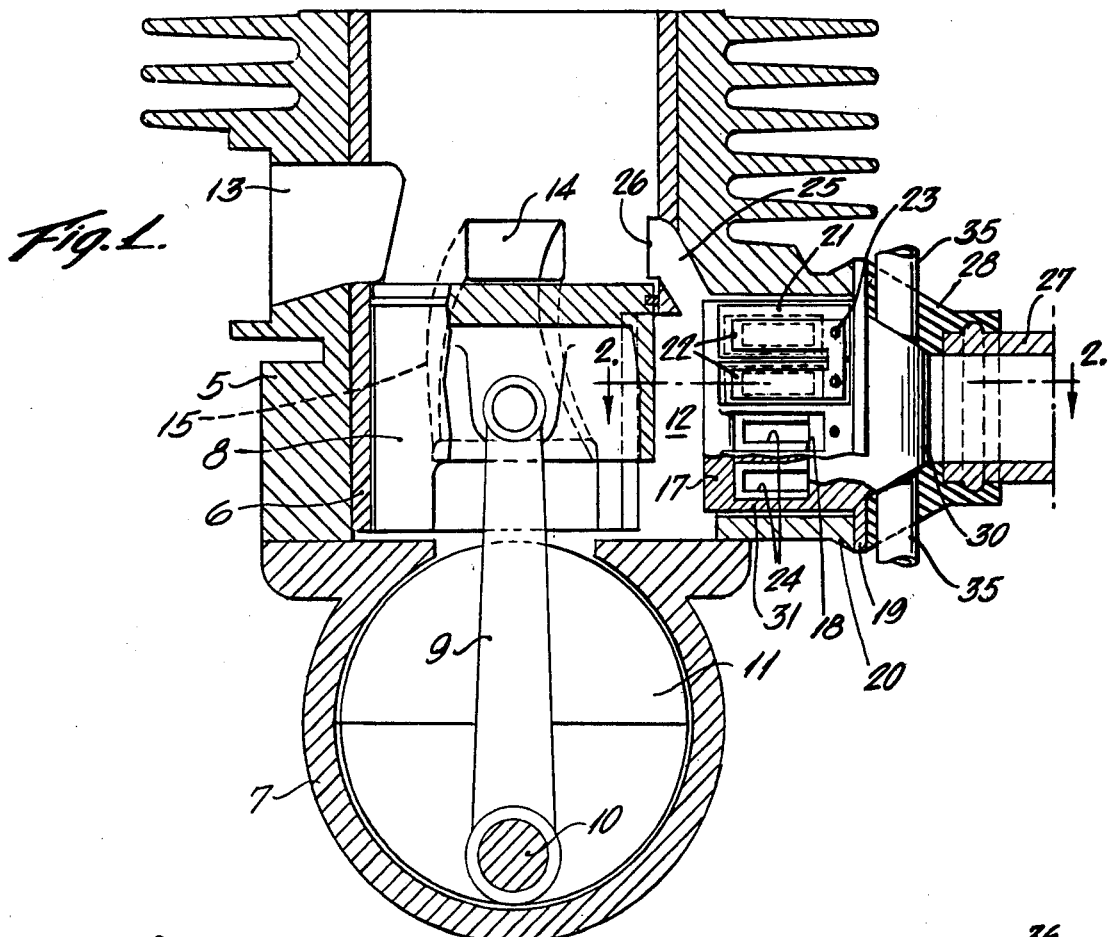
FIG. 1 is a vertical sectional view through portions of a two-cycle internal combustion engine, in which the fuel supply system includes a plurality of reed valves arranged in association with a reed valve support or "cage" having its apex presented downstream of the fuel supply passage and in a position extended generally parallel to the axis of the cylinder.
Figure 2:
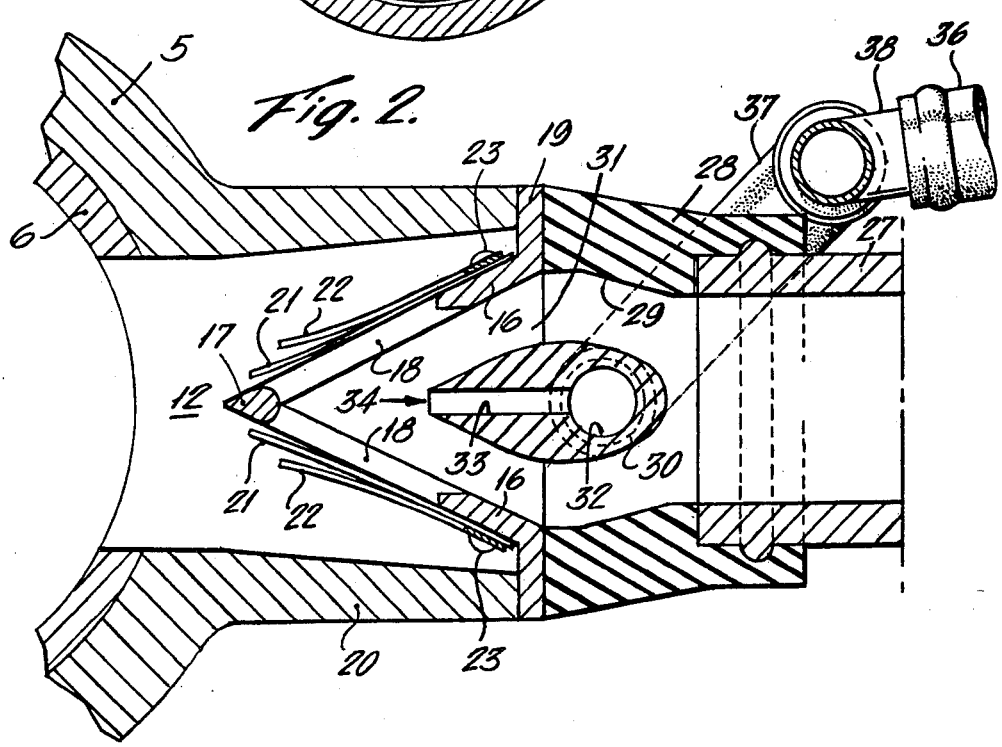
FIG. 2 is a fragmentary horizontal sectional view taken as indicated by the section line 2—2 on FIG. 1, FIG. 2 being on an enlarged scale, as compared with FIG. 1.

DETAILED DESCRIPTION OF THE EMBODIMENT OF FIGS 1, 2 and 3:

In FIGS. 1 and 2, a cylinder is indicated at 5, the cylinder having a liner 6 and being associated with a crankcase 7. The top closure of the cylinder is not illustrated. The piston 8 reciprocates in the cylinder and is associated with a connecting rod 9 associated with the crank 10 in the crankcase. The crank 10 rotates about the crankshaft (not shown), which may also carry the counterweight 11, all as is well-known in this art.

An intake port is indicated at 12, and the cylinder also has an exhaust port 13 and a transfer port 14 which communicates with the space below the piston by means of a transfer passage 15 formed in the wall of the cylinder. As is well-known in the operation of an engine of this type, the fuel and air mixture is admitted into the space below the piston when the piston is in its upper position, and as the piston moves downwardly toward bottom dead center position (the position shown in FIG. 1), the fuel is compressed in the space below the piston, so that at the bottom dead center position, when the transfer port 14 has been opened, the compressed fuel will flow upwardly through the transfer passage 15 and into the cylinder through the transfer port 14. When the piston rises from the bottom dead center position, the port 14 is closed (as is also the exhaust port 13), and the fuel is compressed in the upper portion of the cylinder, whereupon, usually by spark ignition, the fuel is burned and the piston driven downwardly again. The details of this well-known structure and operation need not be considered herein as they are well-known in this art.

In the engine shown in FIGS. 1 and 2, a reed valve cage of generally triangular cross section 16 is illustrated (see particularly FIG. 2), this cage being formed of two valve seats positioned in planes which converge toward each other, i.e., toward the apex member 17, each of the valve seats 16 being provided with a series of valve ports 18 (four such ports being included in this embodiment) through which the fuel passes into the inlet port or porting 12, and thence either directly or indirectly into the combustion space in the cylinder for ultimate combustion to produce the downstroke of the piston. From FIGS. 1 and 2, it will be seen that at the base end of the reed valve cage, a flange 19 is provided which is adapted to be mounted against the extension 20 projecting from the cylinder in order to accommodate and mount the valve means in the fluid flow passage delivering fuel to the intake portion 12.

On each of the valve seats 16, reed valves are provided; and in the embodiment here illustrated, the reed valves associated with each port 18 include a primary reed 21 and a secondary reed 22. The reeds are secured in position by means of screws 23. As will be seen from comparison of FIGS. 1 and 2, each primary reed 21 is of sufficient size to overlie the entire area of the valve port 18 in the seat, and each such primary reed has a "vent" therein as indicated at 24 (see particularly FIG. 1), which vent is adapted to be covered by the secondary reed 22. Although the primary and secondary reeds 21 and 22 are illustrated as being slightly flexed away from the valve seats, it will be understood that when the valves are closed, the primary reed lies snugly against the valve seat and the secondary reed lies snugly against the primary reed. This multiple reed arrangement, which may for convenience be referred to as "vented" reeds, is fully disclosed in my prior U.S. Pat. No. 3,905,340, issued Sept. 16, 1975.

From FIG. 1, it will be seen that the inlet porting 12 is of substantial dimension axially of the cylinder and is open to the space below the piston even when the piston is in bottom dead center position. In addition, a passage 25 extends upwardly from the porting 12 and communicates with the space above the piston in bottom dead center position through a port indicated at 26, such passage and port providing for supplemental transfer and fuel intake when the piston is in the bottom dead center position.

The duct or connection 27, which is associated with the carburetor (not shown), is ordinarily of circular cross section; and as above indicated, is of substantially smaller internal cross-sectional area than the chamber within the extension 20 of the cylinder which accommodates the valve mechanism. Intervening between the duct 27 and the upstream edge of the reed valve cage, there is a connecting part 28 having diverging interior walls 29, this connecting part conveniently being formed of rubber or some composition material and adapted to be fastened at its downstream end to the cylinder through the reed cage flange 19 and adapted to be connected with the duct 27 in any suitable manner.

From the above, it will be seen that the passage walls leading from the carburetor to the intake porting have an internal cross-sectional area which is relatively large in a region at the upstream side of the valve means, as compared with the region in the duct 27 leading to the carburetor; and in the absence of provision to the contrary, this variation in the cross-sectional area of the flow passage would result in substantial decrease in velocity of the fuel mixture in a region just upstream of the valves.

As hereinabove pointed out, the arrangement herein disclosed contemplates the provision of means tending to equalize the velocity of the fuel flow through the various regions of the intake passage or channel. In the arrangement shown in FIGS. 1, 2 and 3, the velocity equalization is achieved by the employment of an element 30 positioned within the region upstream of the valves where the cross-sectional area within the passage walls is relatively large, as compared with the upstream region extended to the carburetor. The element 30 preferably takes the form of a bar with its axis extended parallel to the planes of the valve seats 16 and parallel also to the apex member 17 of the reed cage. Actually, the bar may desirably be formed integrally with the end walls 31 of the reed cage itself although a portion of the bar projects upstream from the reed cage.

As clearly seen in FIG. 2, the element 30 has an aerodynamic or airfoil contour with a rounded leading edge presented upstream and with an angled trailing edge presented downstream. The cross-sectional area of the bar 30 is advantageously at least sufficient to approximately equalize the effective cross-sectional area of flow passage in the region of the bar as compared with the region upstream in the duct 27 extended to the carburetor. For efficient aerodynamic action, it is preferred that the trailing edge surfaces in the downstream portion of the bar 30 should substantially parallel the valve seat walls 16. This aerodynamic shape effectively serves to minimize fluctuation in the velocity of the fuel flow, without substantial impedence of the flow. As seen in FIG. 2, the apex member 17 of the reed cage also desirably has an aerodynamic cross-sectional shape, with the rounded leading edge presented upstream toward the trailing edge of the bar 30, and this further enhances the aerodynamic action in maximizing the flow of the fuel through the valve ports 18, as is brought out in my prior U.S. Pat. No. 4,205,206, issued Nov. 25, 1980.

The maintenance of the relatively high velocity of flow in the region of the valves further enhances the action of the valve reeds, and the use of primary and secondary superimposed reed petals of the kind referred to above is also especially advantageous when used in combination with the aerodynamic bar 30. In explanation of this special advantage, it is first pointed out that with any reed valve, the opening commences at the extreme tip of the reed, the reeds being secured to the reed cage at the base end. With a valve employing single reeds, the tip of each reed is spaced further downstream than the tip of the secondary reeds in an arrangement employing both primary and secondary reeds. In the absence of the aerodynamic bar, the secondary reed would be located in a region of lower fuel flow velocity; but with the presence of the aerodynamic bar, the opening of the secondary reeds is accelerated because of the increase in the fuel flow velocity in the region of the tip of each secondary reed.

In the arrangement as shown in FIGS. 1 and 2, the intake porting 12 extends downwardly sufficiently to provide for communication with the space below the piston above the crankcase space, even when the piston is in bottom dead center position, and this provision, together with the supplemental port 25, is effective in maximizing fuel delivery into the combustion chamber above the piston. The space below the piston also communicates with the crankcase space.

As above indicated, the invention contemplates the use of a fuel vessel or reservoir in combination with an intake system in which an element such as illustrated at 30 is positioned in the intake channel and proportioned to equalize the velocity of the fuel air mixture flowing through the intake channel to the valves. The invention also contemplates providing communication of the reservoir with the intake channel through an orifice in the form of a slot extended across the intake channel.

In the embodiment of FIGS. 1 to 3, the reservoir or fuel vessel is connected with the system through passages formed within the element 30. For this purpose, a transverse passage 32 is extended through the upstream relatively large cross-sectional area of the element 30, as appears in both FIGS. 2 and 3. The center portion of this passage 32 communicates with the laterally flaring passage 33 extended in the downstream direction from the passage 32 toward the trailing or downstream edge of the aerodynamic element or bar 30; and this outwardly flared portion 33 terminates in an orifice 34 of slot-like configuration extended throughout the width of the intake channel and of the reed valves, from one end wall 31 of the reed cage to the other end wall 31 thereof.

Connectors 35, 35 extend from the passage 32 in the element 30 to a point exterior of the portion 28 of the wall structure defining the intake channel, as appears in FIGS. 1 and 3. These connectors are in turn coupled with the hose or other suitable connection 36, by means of hose connections 37, 37 and the T-fitting 38. In turn the connection 36 is coupled with the reservoir or vessel 39 through the fitting 40.

The vessel 39 is desirably a closed vessel, except for the opening in the fitting 40.

The location of the vessel 39 and the connections extended therefrom to the passages in the element 30 may be variously arranged with respect to other engine parts, and desirably the connectors 36 and 37 are formed of flexible tubing. It is preferred to position the parts and to proportion the various connectors so as to provide a symmetrical connection system of the vessel with the passages in the element 30, for instance in the pattern shown in FIG. 3, in order to provide uniformity in flow patterns, particularly when fuel is flowing from the vessel 39 through the passages 32 and 33, and the orifice 34 of the streamlined element 30.

In operation, when the action of the piston 8 in the cylinder, for instance on the downward stroke of the piston causes the reed valves to close, the flow of the mixture of fuel and air in the intake channel will cause introduction of a portion of the fuel-air mixture through the orifice 34 into the tapered passage 33 and thence through the passages 32 and the various connections, into the vessel or reservoir 39. This will result in temporary, short time storage of a quantity of fuel. Upon change in the pressure condition in the cylinder, as by upward movement of the piston 8 in the cylinder, the reed valves are caused to open and fuel enters through the intake channel and through the valves into the cylinder. This change in the pressure condition at the same time causes some of the fuel from the reservoir 39 to flow back into the system and to augment the total quantity of fuel flowing through the reed valves into the cylinder. This flow will reduce the pressure in the reservoir 39 which in turn will induce fuel flow into the reservoir when the valves again close.

The provision of the connection of the reservoir to the intake channel through the element 30 which is proportioned to at least substantially equalize the cross sectional flow areas in the region of and upstream of the valves enhances the action in storage and release of the fuel in the reservoir or vessel 39. This is particularly true in the case of the employment of an element 30 of aerodynamic shape, such as is shown in FIG. 2. The positioning of the orifice presented toward the valves and preferably with the flow axis of the orifice generally paralleling the mean flow path through the valves, is of importance in augmenting the desired action. It is also of significance that the orifice 34 extends throughout the width of the intake channel and also across the assembly of valves.

In operation, the vessel 39 will be effective to store and release fuel over a substantial range of engine speeds, but the capability of the system to store and release fuel will be at a maximum toward the lower end of the engine speed and will extend upwardly to the mid-range, which is desirable, because in some engines (for example, engines in which large size intake ports are most efficient at the high engine speeds) increase in fuel input to the engine is of particular importance at the low and mid-range engine speeds. From FIG. 2 it will be noted that the pair of hose connections 37 extend toward one side of the intake channel, but it will be understood that, depending on the location of other engine equipment, the connections may be extended in other directions, depending on the clearance limitations. In some instances the reed valve cage is commonly arranged with a horizontal apex instead of the vertical apex as shown in FIGS. 1 and 2. Indeed, in my prior U.S. Pat. No. 4,228,770 above referred to, a reed cage having a horizontal apex is also disclosed, and in that event, the hose connections such as shown at 37 would preferably be extended upwardly and away from the cylinder for purposes of maintaining an appropriate clearance for other equipment.

DETAILED DESCRIPTION OF THE EMBODIMENT OF FIG. 4

In FIG. 4 there is illustrated an alternative form of vessel or reservoir 39a. In this embodiment an apertured partition 41 is provided, dividing the volume of the vessel 39a into two portions, one of which (to the right of the partition) is of smaller volume than the volume at the other side of the partition. This type of partitioned vessel may be utilized to provide different effective fuel storage capacity at different engine speeds. At very low speeds, the entire volume of both chambers of the vessel will be effective for storage and release of fuel, but as the engine speed increases, the aperture in the partition will restrict flow and will, in effect, reduce the effective total volume of the reservoir to a value approximating that of the chamber lying between the partition and the connection 40 extending to the fuel system of the engine. The effect of the partition 41 in the reservoir is to automatically reduce the volume of the reservoir at high engine speeds, and this is desirable because at high engine speeds there is insufficient time for the fuel entering and leaving the reservoir to flow into and from the regions of the reservoir remote from the connection 40.

Preferably the aperture in the partition 41 should be of smaller cross-section than the cross-sectional dimension of the connections extended to the intake channel.

It will be understood that the proportioning and positioning of the aerodynamic bar employed to equalize the fuel velocity in different portions of the intake tract may be varied according to the shape of the passages involved. Moreover, somewhat different cross-sectional shapes may be employed for the element introduced in the fuel flow passage, but an aerodynamic cross-sectional shape is preferred because it is effective for the purpose of equalizing the velocity while at the same time, minimizing aerodynamic drag which would unnecessarily impede the flow of the fuel.

It should also be understood that the vessel or reservoir employed may take a variety of forms and may also be of various different sizes, depending upon the operating conditions desired.

I claim:

1. An internal combustion engine having a piston working in a cylinder and with a fuel intake channel for delivery of fuel to the cylinder under the influence of pressure changes effected by motion of the piston, valve means in the intake channel for controlling the flow of fuel through the intake channel, walls defining the intake channel upstream of the valve means with portions of such walls at different distances from each other in different regions upstream and downstream of the intake channel thereby providing different cross-sectional areas within said walls in said different regions, an element positioned in the intake channel upstream of the valve means and spaced from said walls and proportioned to reduce the difference in cross-sectional flow areas in said different regions, a passage within said element and having an orifice presented downstream of the intake channel, and a vessel positioned externally of the intake channel and having a connection communicating with the passage within said element.

2. An internal combustion engine as defined in claim 1 in which the walls of the intake channel upstream of the valve are more widely spaced in an upstream region as compared with a downstream region and in which the element positioned in the intake channel is of greater cross-sectional dimension in said upstream region than in said downstream region, and in which the connection of said external vessel with the passage in said element is arranged in the region of greater cross-sectional dimension of the element.

3. An internal combustion engine as defined in claim 2 in which the orifice presented downstream of said element is located in the downstream region of said element.

4. An internal combustion engine as defined in claim 3 in which said element has a cross-sectional shape of aerodynamic contour and in which said orifice is located in the region of the trailing edge of said aerodynamic contour.

5. An internal combustion engine having a piston working in a cylinder and with a fuel intake channel for delivery of fuel to the cylinder under the influence of pressure changes effected by motion of the piston, reed valve means positioned to provide for flow into the cylinder but to block flow from the cylinder into the intake channel, walls defining the intake channel upstream of the valve means with portions of such walls at different distances from each other in different regions upstream and downstream of the intake channel thereby providing different cross-sectional areas within said walls in said different regions, an element within the intake channel upstream of the valve means and spaced from said walls and proportioned to reduce the difference in cross-sectional flow area in said different regions, and a vessel positioned externally of the intake channel and having a connection communicating with the intake channel in the region thereof adjacent the downstream side of said element.

6. An internal combustion engine having a piston working in a cylinder and with a fuel intake channel for delivery of fuel in a predetermined flow path to the cylinder under the influence of pressure changes effected by motion of the piston, valve means in the intake channel for controlling the flow of fuel through the intake channel in said path, a vessel positioned externally of the intake channel and having a connection communicating with the intake channel upstream of the valve means, said connection having an orifice positioned in the flow path upstream of the valve means and presented axially of the flow path toward the valve means.

7. An internal combustion engine as defined in claim 6 in which said connection includes a tubular element extended transversely across the intake channel upstream of the valve means and having an orifice in the form of a slot presented toward the valve means.

* * * * *